US010440064B2

(12) United States Patent
Beattie, Jr. et al.

(10) Patent No.: US 10,440,064 B2
(45) Date of Patent: Oct. 8, 2019

(54) SYSTEM FOR PROVIDING EFFICIENT DELIVERY OF MEDIA CONTENT TO THE MASSES

(71) Applicant: AT&T INTELLECTUAL PROPERTY I, L.P., Atlanta, GA (US)

(72) Inventors: James G. Beattie, Jr., Bergenfield, NJ (US); Luis Ramos, Columbia, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 295 days.

(21) Appl. No.: 14/984,135

(22) Filed: Dec. 30, 2015

(65) Prior Publication Data

US 2017/0195396 A1      Jul. 6, 2017

(51) Int. Cl.
*H04L 29/06* (2006.01)

(52) U.S. Cl.
CPC ........ *H04L 65/1016* (2013.01); *H04L 65/105* (2013.01); *H04L 65/4084* (2013.01); *H04L 65/80* (2013.01)

(58) Field of Classification Search
CPC ... H04L 29/08072; H04L 29/06; H04L 43/00; H04L 12/2602; H04L 41/22; H04N 5/85; H04N 5/781; H04N 9/8042; H04N 5/775; G11B 27/105
USPC .......................................................... 709/224
See application file for complete search history.

(56) References Cited

U.S. PATENT DOCUMENTS

| | | | |
|---|---|---|---|
| 6,816,909 B1 | 11/2004 | Chang et al. | |
| 7,274,661 B2 | 9/2007 | Harrell et al. | |
| 8,239,573 B2 | 8/2012 | Brownrigg | |
| 8,544,048 B2 * | 9/2013 | Wiser | H04N 7/17336 725/44 |
| 8,719,871 B2 | 5/2014 | Boersma | |
| 8,824,453 B2 | 9/2014 | Li et al. | |
| 9,118,738 B2 | 8/2015 | Archer et al. | |
| 2005/0144640 A1 | 6/2005 | Fritsch et al. | |
| 2008/0101405 A1 | 5/2008 | Wirick et al. | |

(Continued)

OTHER PUBLICATIONS

Cuomo et al., "IPTV over xDSL," Sapienza Universita Di Roma, Rome 2011, document of 29 pages.

(Continued)

*Primary Examiner* — Mahran Y Abu Roumi
(74) *Attorney, Agent, or Firm* — Akerman LLP; Michael K. Dixon; Mammen (Roy) P. Zachariah, Jr.

(57) ABSTRACT

A system for providing efficient delivery of media content to the masses is disclosed. In particular, the system may include receiving requests for content from a plurality of user devices. The system may then include synchronizing fulfillment timeframes for delivering the content based on a preset time interval. In response to the requests, the system may deliver the content, such as via a satellite network, to a storage device, such as, but not limited to, a digital video recorder, a video-ready-access device equipped with a satellite receiver and antenna, a digital subscriber line access multiplexer equipped with a satellite received and antenna, or any combination thereof, based on the preset time interval. The system may then include causing the storage device to deliver the requested content to the plurality of user devices via a wireless network communicatively linked to the plurality of user devices.

18 Claims, 3 Drawing Sheets

(56) References Cited

U.S. PATENT DOCUMENTS

| | | | |
|---|---|---|---|
| 2008/0192820 A1* | 8/2008 | Brooks | H04N 7/17318 |
| | | | 375/240.02 |
| 2011/0299544 A1 | 12/2011 | Lundgren et al. | |
| 2012/0066338 A1 | 3/2012 | Asarikuniyil et al. | |
| 2012/0082424 A1* | 4/2012 | Hubner | H04N 21/242 |
| | | | 386/219 |
| 2012/0151042 A1* | 6/2012 | Garg | H04L 65/4084 |
| | | | 709/224 |
| 2014/0108602 A1* | 4/2014 | Barnes | H04W 4/02 |
| | | | 709/217 |
| 2014/0244805 A1 | 8/2014 | Lee et al. | |
| 2015/0264437 A1 | 9/2015 | Biewer et al. | |
| 2015/0288733 A1* | 10/2015 | Mao | H04L 65/4076 |
| | | | 709/219 |

OTHER PUBLICATIONS

Ahamed, "Analysis of the Issues of Effective Broadband Media Services Deployment in the Computer Communication," International Journal of Engineering Science and Technology, vol. 2(6), 2010, 2095-2102.

* cited by examiner

SYSTEM FOR PROVIDING EFFICIENT DELIVERY OF MEDIA CONTENT TO THE MASSES

FIELD OF THE INVENTION

The present application relates to technologies for content distribution and streaming, satellite networks, cellular networks, wireless networks, and network optimization technologies, and more particularly, to a system and method for providing efficient delivery of media content to the masses.

BACKGROUND

In today's society, users are increasingly utilizing network and other service providers to gain access to the Internet, request and access various types of content, access software applications, access software services, and perform a variety of other tasks and functions. As an example, an increasing number of users are subscribing to internet protocol television (IPTV) services provided by service providers in order to access various types of media content, such as, but not limited to, television shows, movies, and programs. Users of such services often utilize media processing devices, such as digital video recorders, to record and store various types of media content provided by various content providers. For example, if certain media content of interest is airing at a time that a user cannot view in real-time, the user may set the digital video recorder to record the media content so that the user can view the recorded media content at another time. Additionally, users are increasingly utilizing mobile devices, such as smartphones and tablets, to access media content, such as through mobile communication networks. Often times, such content is delivered through such networks through the use of various content delivery servers and technologies.

While current content delivery technologies provide a variety of beneficial features and functions, there is still room to substantially enhance and improve such technologies. For example, current implementations of on-demand media content delivery are heavily dependent on the availability of internet connectivity options, most of which are assumed to be wired. Additionally, there is a sizable and growing community of customers that have "cut the cord" and now depend on the use of various wireless technologies for the effective delivery of media content. Furthermore, congestion bottlenecks may arise when there are multiple simultaneous demands for content, particularly when there are limited amounts of cellular, satellite, Wi-Fi, or other network technologies available for the delivery of media content. Based on the foregoing, content delivery technologies may be modified so as to provide enhanced quality-of-service for users, improved functionality for users, and additional features for users. Such enhancements and improvements to content delivery technologies may provide for improved customer satisfaction, improved user experiences, and increased savings for service providers.

SUMMARY

A system and accompanying methods for providing efficient delivery of media content to the masses are disclosed. In particular, the system and methods ensure that networks, such as wireless networks, are not overwhelmed with bandwidth demands that they cannot satisfy, while service providers and/or customers retain control of the timeliness, cost, and geographic availability elements relating to access of media content. In order to accomplish the foregoing, the system and methods may include providing efficient delivery of media content, particularly when multiple users are seeking the same content in the same general area. Initially, the system and methods may include receiving one or more requests for content from a plurality of user devices associated with one or more users. A service provider and/or users subscribing to the services of the service provider may synchronize fulfillment timeframes for delivering the content by agreeing to a scheduled download of the content at a later preset time, or at an even later time through the use of a storage mechanism, such as a digital video recorder or other media storage center.

Once the fulfillment timeframes are synchronized for delivering the content, the system and methods may include delivering the content, such as via a satellite network or other network, to the storage mechanism based on the preset time interval. If there are one or more wireless networks physically available to the plurality of user devices, the content may be delivered from the storage mechanism to the plurality of user devices via the one or more wireless networks. In certain embodiments, the content may be delivered to the plurality of user devices in non-real time using a low-bandwidth delivery mode that employs storage-based buffering, which may be configured to allow the content to be presented at a later selected time. In certain embodiments, the content may be delivered via a cellular network if the fulfillment timeframe for delivery does not have a heavy impact on the cellular network.

In certain embodiments, a device may be configured to serve as a media collection proxy for another device owned, managed, and/or controlled by the same entity. Once the content is delivered to the device serving as the media collection proxy, the content may be transferred from the media collection proxy to the other device when the media collection proxy and the other device converge in the same environment. In still further embodiments, a very-high-bit-rate digital subscriber line (VDSL) Remote Access Device, such as a video-ready access device (VRAD) and/or a digital subscriber line access multiplexer (DSLAM), may be equipped with a satellite receiver and antenna and a Wi-Fi, Wi-Max or other wireless technology to supplant or supplement a wired backhaul of a cell site in order to deliver content to the plurality of user devices. Once the content is delivered to the one or more of the plurality of user devices, the user devices may present the content at a time designated by the user, the service provider, and/or a content provider.

In one embodiment, a system for providing efficient delivery of media content to the masses is disclosed. The system may include a memory that stores instructions and a processor that executes the instructions to perform various operations of the system. The system may perform an operation that includes receiving a plurality of requests for content from a plurality of user devices. Additionally, the system may perform an operation that includes synchronizing, in response to the plurality of requests, fulfillment timeframes for delivering the content to the plurality of user devices. In certain embodiments, the fulfillment timeframes may be synchronized based on a preset time interval for delivering the content. In certain embodiments, the fulfillment timeframes may indicate the preset time interval for delivering the content. The system may perform an operation that includes delivering, via a satellite network and in response to the plurality of requests, the content to a storage device according to the preset time interval. Finally, the system may perform an operation that includes delivering, via a wireless network communicatively linked to the plurality of user devices, the content from the storage device to the plurality of user devices.

In another embodiment, a method for providing efficient delivery of media content to the masses is disclosed. The method may include utilizing a memory that stores instructions, and a processor that executes the instructions to perform the various functions of the method. The method may include receiving a plurality of requests for content from a plurality of user devices. Additionally, the method may include synchronizing, in response to the plurality of requests, fulfillment timeframes for delivering the content to the plurality of user devices. In certain embodiments, the fulfillment timeframes may be synchronized based on a preset time interval for delivering the content. In certain embodiments, the fulfillment timeframes may provide an indication of the preset time interval for delivering the content. Furthermore, the method may include delivering, via a satellite network and in response to the plurality of requests, the content to a storage device according to the preset time interval. Moreover, the method may include transmitting, via a wireless network communicatively linked to the plurality of user devices, the content from the storage device to the plurality of user devices.

According to yet another embodiment, a computer-readable device having instructions for providing efficient delivery of media content to the masses is provided. The computer instructions, which when loaded and executed by a processor, may cause the processor to perform operations including: receiving a plurality of requests for content from a plurality of user devices; synchronizing, in response to the plurality of requests, fulfillment timeframes for delivering the content to the plurality of user devices, wherein the fulfillment timeframes are synchronized based on a preset time interval for delivering the content; delivering, via a satellite network and in response to the plurality of requests, the content to a storage device according to the preset time interval; and delivering, via a wireless network communicatively linked to the plurality of user devices, the content from the storage device to the plurality of user devices.

These and other features of the systems and methods for providing efficient delivery of media content to the masses are described in the following detailed description, drawings, and appended claims.

DETAILED DESCRIPTION OF THE INVENTION

Figure 1:
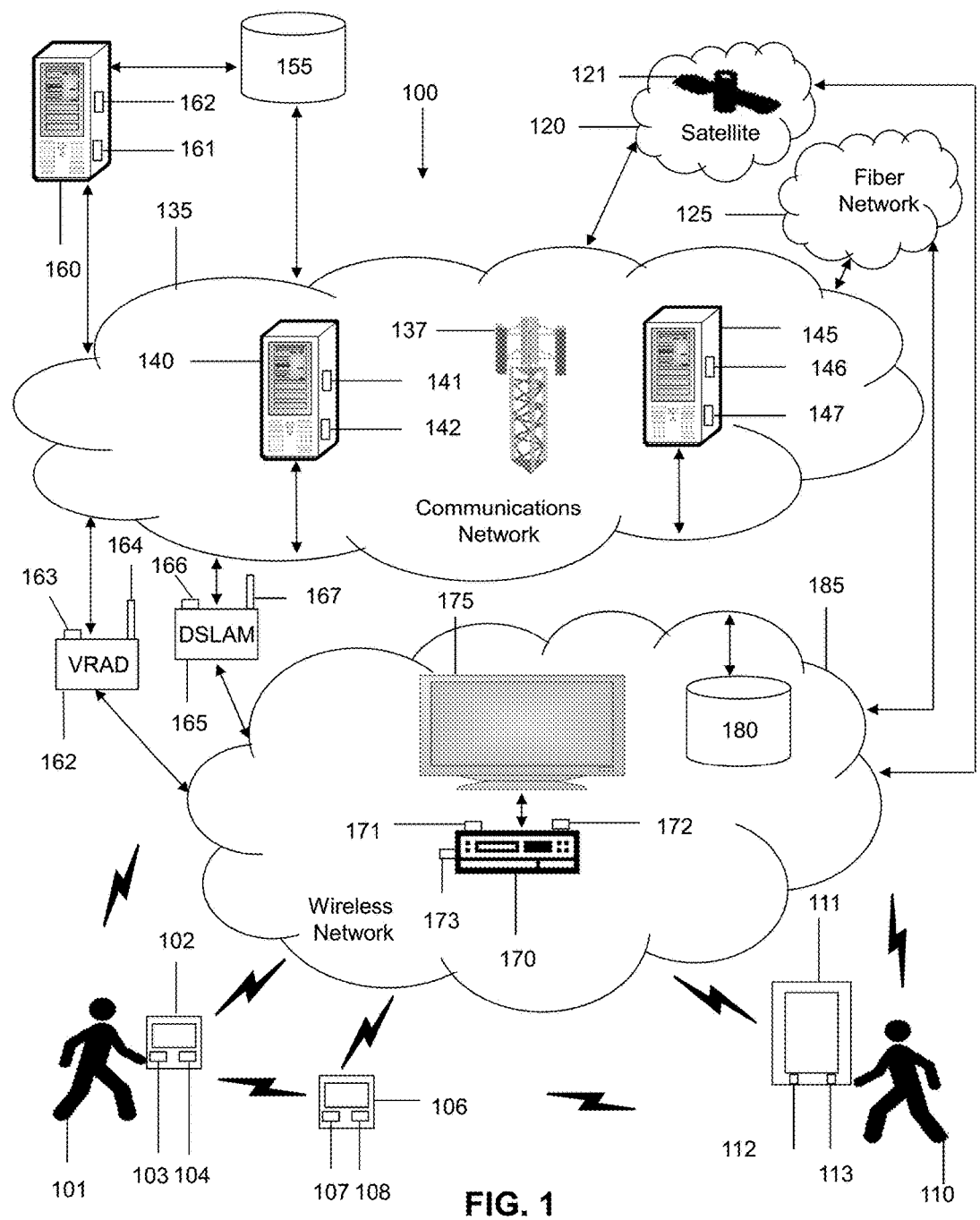
FIG. 1 is a schematic diagram of a system for providing efficient delivery of media content to the masses according to an embodiment of the present disclosure.

A system 100 and accompanying methods for providing efficient delivery of media content to the masses are disclosed. In particular, the system 100 and methods ensure that networks, such as wireless networks, are not overwhelmed with bandwidth demands that they cannot satisfy, while service providers and/or customers retain control of the timeliness, cost, and geographic availability elements relating to access of media content. In order to accomplish the foregoing, the system 100 and methods may include providing efficient delivery of media content, particularly when multiple users (e.g. first user 101 and second user 110) are seeking the same content in the same general area. Initially, the system 100 and methods may include receiving one or more requests for content from a plurality of user devices (e.g. first user device 102, second user device 106, and third user device 111) associated with one or more users. A service provider and/or users subscribing to the services of the service provider may synchronize fulfillment timeframes for delivering the content by agreeing to a scheduled download of the content at a later preset time, or at an even later time through the use of a storage mechanism, such as a digital video recorder 170 or other media storage center.

Once the fulfillment timeframes are synchronized for delivering the content, the system 100 and methods may include delivering the content, such as via a satellite network 120 or other network (e.g. fiber network 125), to the storage mechanism based on the preset time interval. If there are one or more wireless networks (e.g. wireless network 185) physically available to the plurality of user devices, the content may be delivered from the storage mechanism to the plurality of user devices via the one or more wireless networks. In certain embodiments, the content may be delivered to the plurality of user devices in non-real time using a low-bandwidth delivery mode that employs storage-based buffering, which may be configured to allow the content to be presented at a later selected time. In certain embodiments, the content may be delivered via a cellular network if the fulfillment timeframe for delivery does not have a heavy impact (e.g. threshold impact on bandwidth) on the cellular network.

In certain embodiments, a device may be configured to serve as a media collection proxy for another device owned, managed, and/or controlled by the same entity. Once the content is delivered to the device serving as the media collection proxy, the content may be transferred from the media collection proxy to the other device when the media collection proxy and the other device converge in the same environment. In still further embodiments, a VDSL Remote Access Device, such as a VRAD 162 and/or a DSLAM 165, may be equipped with a satellite receiver and antenna and a Wi-Fi, Wi-Max or other wireless technology to supplant or supplement a wired backhaul of a cell site 137 in order to deliver content to the plurality of user devices. Once the content is delivered to the one or more of the plurality of user devices, the user devices may present the content at a time designated by the user, the service provider, and/or a content provider. As a result, the system 100 and methods provide a flexible set of efficient content delivery options for both service providers and users, which also ensure that the networks involved are not overwhelmed.

As shown in FIG. 1, a system 100 that provides efficient delivery of media content to the masses is disclosed. The system 100 may be configured to support, but is not limited to supporting, IPTV services, digital video recorder services, cloud computing services, content delivery services, IP Multimedia Subsystem (IMS) services, satellite services, fiber services, telephone services, voice-over-internet protocol services (VoIP), voice-over-long-term-evolution (VoLTE) services, LTE services, software as a service (SaaS) applications, gaming applications and services, social media applications and services, operations management applications and services, productivity applications and services, mobile applications and services, and any other computing applications and services. The system may include a first user 101 that may utilize a first user device 102 to access content, data, and services, or to perform a variety of other functions. As an example, the first user 101 may utilize first user device 102 to transmit signals to the system 100 to request various types of media content, store media content on the digital video recorder 170, control the digital video recorder 170, control the media device 175, perform any other operations, or any combination thereof. Media content may include, but is not limited to, audio content, video content, image content, web content, text content, any type of content, or any combination thereof. In certain embodiments, the media content may be static content, dynamic content, or a combination of static and dynamic content.

In certain embodiments, the first user 101 may be a subscriber of a service provider that controls communications network 135 and/or the wireless network 185. The first user device 102 may be equipped for mobile communication. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIG. 1. In certain embodiments, the first user device 102 may communicate with the digital video recorder 170, other devices in the system 100, or any combination thereof, by utilizing infrared radiation, Bluetooth connectivity, ZigBee, Z-Wave, any type of wireless protocol, radio technologies, or any combination thereof.

The first user 101 may also utilize a second user device 106 to access content, data, and services, or to perform a variety of other functions. As with the first user device 102, the first user 101 may utilize second user device 106 to transmit signals to the system 100 to request various types of media content, store media content on the digital video recorder 170, control the digital video recorder 170, control the media device 175, perform any other operations, or any combination thereof. The second user device 106 may be equipped for mobile communication. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. In certain embodiments, the second user device 106 may be a computer, a laptop, a set-top-box, a tablet device, a phablet, a server, a mobile device, a smartphone, a smart watch, or any other type of computing device. Illustratively, the second user device 106 is shown as a laptop device in FIG. 1. In certain embodiments, the second user device 106 may communicate with the digital video recorder 170, other devices in the system 100, or any combination thereof, by utilizing infrared radiation, Bluetooth connectivity, ZigBee, Z-Wave, any type of wireless protocol, radio technologies, or any combination thereof.

The system may also include a second user 110 that may utilize a third user device 111 to also access content, data, and services, and to perform a variety of other functions. For example, the third user device 111 may be utilized by the second user 110 to transmit signals to request various types of content, services, and data provided by content and service providers associated with the communications network 135 or any other network in the system 100. In certain embodiments, the second user 110 may be a subscriber of a service provider that controls communications network 135. The third user device 111 may be equipped for mobile communication. The third user device 111 may include a memory 112 that includes instructions, and a processor 113 that executes the instructions from the memory 112 to perform the various operations that are performed by the third user device 111. In certain embodiments, the processor 113 may be hardware, software, or a combination thereof. Similar to the first and second user devices 102, 106, in certain embodiments, the third user device 111 may be a computer, a laptop, a tablet device, a phablet, a server, a mobile device, a smartphone, a smart watch, or any other type of computing device. Illustratively, the third user device 111 is shown as a tablet device in FIG. 1. In certain embodiments, the third user device 111 may communicate with the digital video recorder 170 by utilizing infrared radiation, Bluetooth connectivity, ZigBee, Z-Wave, any type of wireless protocol, radio technologies, or any combination thereof.

In certain embodiments, the first, second, and third user devices 102, 106, 111 may have any number of software applications and/or application services stored and/or accessible thereon. For example, the first, second, and third user devices 102, 106, 111 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first, second, and third user devices 102, 106, 111 may include associated telephone numbers, device identities, or any other identifiers to uniquely identify the first, second, and third user devices 102, 106, 111.

In certain embodiments, the first, second, and third user devices 102, 106, 111 may have corresponding device profiles. In certain embodiments, each of the devices in the system 100 may have its own corresponding device profile. For example, the media device 175 and the digital video recorder 170 of system 100 may have their own device profiles. Information included in a device profile may include, but is not limited to, information specifically corresponding to the first, second, and third user devices 102, 106, 111, information identifying the types of devices that the first, second, and third user devices 102, 106, 111 are, information relating to how the first user 101 utilizes the first user device 102 and/or second user device 106, information relating to how the second user 110 utilizes the third user device 111, information identifying what type of services and information the first user 101 and second user 110 are authorized to access, information indicating each type of component included in the first, second, and third user devices 102, 106, 111, information identifying the processing power, storage capacity, download capabilities, upload capabilities, and content delivery services subscriptions associated with the first, second, and third user devices 102, 106, 111, any other information associated with the first, second, and third user devices 102, 106, 111, or any combination thereof. The device profiles may be made accessible to any device, network, or a combination thereof, in the system 100.

In addition to device profiles, the system 100 may also include user profiles. A user profile may be a profile corresponding to the first user 101, the second user 110, or any other user. For example, the first user's 101 profile may include information, such as, but not limited to, a name of the first user 101, the age of the first user 101, demographic information associated with the first user 101, information identifying the first user device 102 and/or second user device 106 of the first user 101, the types of services, such as content delivery services, subscribed to by the first user 101, information identifying a location of the first user 101, information identifying the type of content the first user 101 likes, information identifying the types of applications that the first user 101 utilizes, and any other information. The user profiles may be stored directly on the first user device 102, the second user device 106, the third user device 111, the database 155, on any other device in the system 100, or on any combination thereof. Additionally, the user profiles may be accessible by any device in the system 100, any network in the system 100, or a combination thereof.

The system 100 may also include a satellite network 120, which may include one or more satellites 121, to provide content delivery services and/or any other type of services. The satellite network 120 may include any features, components and/or functionality of a traditional satellite network and may be communicatively linked with any device and/or network included in the system 100. In certain embodiments, the satellites 121 of the satellite network 120 may be fed content by a content provider, a service provider, or any combination thereof. The satellites 121 of the satellite network 130 may deliver any type of content to communications network 135, wireless network 185, any other network, any device in the system 100 (e.g. digital video recorder 170, first, second, and third user devices 102, 106, 111, etc.), or any combination thereof. Additionally, the system 100 may include a fiber network 125 that may include optical fiber to provide content delivery services and/or any other type of services. The fiber network 125 may include any features of a traditional fiber network and may be communicatively linked with any device and/or network included in the system 100. The fiber network 125 may deliver any type of content to communications network 135, wireless network 185, any other network, any device in the system 100, or any combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by the first and second users 101, 110. The communications network 135 may also include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a multiprotocol label switching (MPLS) network, a content distribution network, an internet protocol television network, any network, or any combination thereof. Illustratively, servers 140, 145 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to deliver media content and services using an internet protocol suite and by utilizing packet switching. The communications network 135 may provide the ability to stream media requested by the first and second users 101, 110, provide live television services, provide for media-on-demand, provide any type of content, or any combination thereof. In certain embodiments, the communications network 135 may include any of the components and functionality found in traditional internet protocol television networks. The communications network 135 may include one or more cell sites 137 that may be utilized to communicate with the first user device 102, the second user device 106, the third user device 111, the digital video recorder 170, the satellite network 120, the fiber network 125, the server 160, the storage device 180, any other device, or any combination thereof. In certain embodiments, the cell site 137 may include hardware components that include any of the functional features of a radio access network. The cell site 137 may be configured to provide cellular services (e.g. LTE services), any type of services, or any combination thereof. Additionally, the cell site 137 may include any of the functionality of a base station utilized in mobile communication networks. For example, the cell site 137 may include any number of antennae, transceivers, digital signal processors, control electronics, GPS receivers, electrical power sources, radio equipment, and electronics equipment to create a cell for the communications network 135. The cell site 137 may be configured to communicate with and receive content and data streams from the satellite network 120, the fiber network 125, the wireless network 185, or any combination thereof.

Notably, the functionality of the system 100 may be supported and executed by using any combination of the servers 140, 145, and 160. The servers 140, 145, and 160 may be content delivery servers and may include any functionality associated with content delivery servers. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, the wireless network 185, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a content source for stored content that may be accessed by the communication network 135 so that the communication network 135 may obtain content for the first and second users 101, 110 in an efficient and effective manner. In certain embodiments, the database 155 may serve as a central repository for content and information requested by the first and second users 101, 110. Furthermore, the database 155 may include a processor and memory or be connected to a processor and memory to perform the various operation associated with the database 155.

In certain embodiments, the database 155 may be connected to servers 140, 145, 160, cell site 137, first user device 102, second user device 106, third user device 111, digital video recorder 170, media device 175, the storage device 180, or any combination thereof. The database 155 may also store information and metadata obtained from the system 100, store media content, store metadata and other information associated with the first and second users 101, 110, store user profiles associated with the first and second users 101, 110, store device profiles associated with the first user device 102, the second user device 106, the third user device 111, the digital video recorder 170, the media device 170, and/or the storage device 180, store location information, store communications traversing the system 100, store user preferences, store information associated with any device or signal in the system 100, store information relating to patterns of usage relating to the first, second, and third user devices 102, 106, 111, store content, store software updates for updating devices in the system 100, store data for Internet of Things devices, store mobile versions of media content, store different resolutions of media content, store service subscription information associated with content delivery services subscribed to by the first and second users 101, 110, store information utilized for identifying communications network 135, wireless network 185, or any combination thereof, store synchronization information for fulfillment timeframes, store preset time interval information, store network condition information, store lists identifying all devices associated with a particular user, store accessibility information associated with accessing wireless network 185, store information associated with VRAD 162, store information associated with DSLAM 165, store any information traversing the system 100, or any combination thereof. Furthermore, the database 155 may be configured to process queries sent to it by any device in the system 100.

In certain embodiments, the system 100 may include a VRAD 162, which may be a VDSL Remote Access Device. The VRAD 162 may be a network node that may be installed in the first user's 101 and/or second user's 110 neighborhoods. In certain embodiments, any number of VDSL lines in the system 100 may converge at the VRAD 162. In certain embodiments, the VRAD 162 may serve as a local Fiber to the Neighborhood (FTTN) for voice, video, and/or data services provided by a service provider of the system 100. In certain embodiments, the VRAD 162 may incorporate any of the features and/or functionality of a traditional VRAD. The VRAD 162 may be communicatively linked with any device, network, and/or component of the system 100. In certain embodiments, the VRAD 162 may include a satellite receiver 163 and/or an antenna 164. The satellite receiver 163 and/or antenna 164 may be utilized by the VRAD 162 to communicate with the satellite network 120 and to receive any type of content, data, and/or information from the satellite network 120. In certain embodiments, the VRAD 162 may also include a Wi-Fi, Wi-Max and/or other wireless technology to supplant or supplement a wired backhaul associated with the cell site 137, so as to provide an alternative means for delivering content to any device and/or network of the system 100.

In certain embodiments, the system 100 may include a DSLAM 165, which may also be a VDSL Remote Access Device. The DSLAM 165 may be a network device that may be utilized to connect one or more customer digital subscriber line interfaces to a high-speed digital communications channel using any number of multiplexing techniques. The DSLAM 165 may be utilized to collect data and aggregate voice and data traffic into a composite signal via multiplexing. In certain embodiments, the DSLAM 165 may include any of the features and/or functionality of a traditional DSLAM. The DSLAM 165 may be communicatively linked with any device, network, and/or component of the system 100. In certain embodiments, the DSLAM 165 may include a satellite receiver 166 and/or an antenna 167. The satellite receiver 166 and/or antenna 167 may be utilized by the DSLAM 165 to communicate with the satellite network 120 and to receive any type of content, data, and/or information from the satellite network 120. In certain embodiments, the DSLAM 165 may also include a Wi-Fi, Wi-Max and/or other wireless technology to supplant or supplement a wired backhaul associated with the cell site 137, so as to provide an alternative means for delivering content to any device and/or network of the system 100.

The system 100 may also include a digital video recorder 170, which may be a device that may be configured to record and store media content and information, access media content, perform any of the functionality of a traditional digital video recording device, or any combination thereof. The digital video recorder 170 may enable the first and second users 101, 110 to request media content, select media content for recording and/or download, pause the playing of media content, rewind media content, fast-forward media content, and/or to perform other similar operations associated with a digital video recorder. In certain embodiments, the digital video recorder 170 may be included within a set-top box, may be connected to a set-top box, may be included within a gateway, may be connected to a gateway, may be included within a portable media player, may be connected to a portable media player, or any combination thereof. In certain embodiments, the digital video recorder 170 and the media device 175 may be housed together as a single device. The digital video recorder 170 may be controlled by the first user 101 by utilizing the first user device 102 and/or any controls present on the digital video recorder 170 itself. For example, the first user 101 may control the digital video recorder 170 by utilizing any number of input devices on the first user device 102, the second user device 106, and/or digital video recorder 170. Similarly, the second user 110 may control the digital video recorder 170 by utilizing the third user device 111 and/or any controls present on the digital video recorder 170. For example, the second user 110 may control the digital video recorder 170 by utilizing a media application of the third user device 111 that includes a user interface featuring controls for the digital video recorder 170. In certain embodiments, a service provider of the first and second users 101, 110 may control the digital video recorder 170.

In certain embodiments, the digital video recorder 170 may include a transceiver 171 for communicating with the devices in the system 100. In certain embodiments, the digital video recorder 170 may include any necessary software and componentry for communicating with mobile devices, such as, but not limited to, first user device 102, second user device 106, third user device 111, the cell site 137, the servers 140, 145, the satellite network 120, the fiber network 125, or any combination thereof. The digital video recorder 170 may also include a storage component 172 that may be configured to store media content and data. Additionally, the storage component 172 may be configured to store user preferences associated with the media content, information identifying the specific subscriptions that the first and second users 101, 110 have purchased, information identifying the types of services that may be provided to the first and second users 101, 110, any other information, or any combination thereof. Furthermore, the storage component 172 may be configured to store instructions that may be executed by a processor 173 of the digital video recorder 170 to perform various operations that are performed by the digital video recorder 170. The processor 173 may be hardware, software, or a combination thereof. The digital video recorder 170 may also include one or more applications, which may be configured to record media content based on one or more inputs received from the first user device 102, the second user device 106, the third user device 111, or a combination thereof. In certain embodiments, the digital video recorder 170 may be configured to employ storage-based buffering to assist in low-bandwidth delivery modes utilized by the system 100.

The system 100 may also include a media device 175. The media device 175 of the system 100 may be a monitor, a television, a tablet device, a computer, or any other type of device including a display that is capable of displaying media content. In certain embodiments, the media device 175 may be controlled by utilizing the first user device 102, the second user device 106, the third user device 111, the digital video recorder 170, by utilizing controls on the media device 175 itself, or by a service provider associated with the first and second users 101, 110. The media device 175 may be configured to communicate with the digital video recorder 170, the first user device 102, the second user device 106, the third user device 111, any other device, or any combination thereof. In certain embodiments, the media device 175 may include any number of memories configured to store instructions and processors configured to execute the instructions to perform various operations performed by the media device 175. The media device 175 may be configured to display or otherwise output media content provided by the digital video recorder 170 or by any other device in the system 100. In certain embodiments, the media device 175 may be configured to communicate with any of the devices, networks, and components of the system 100.

In certain embodiments, the system may include a storage device 180, which may be configured to store any data traversing the system 100, any media content, any data, any information, software updates, data files, or any combination thereof. In certain embodiments, the storage device 180 may include any of the features, functionality, and/or capabilities of database 155. In certain embodiments, the storage device 180 may be a mass storage device that may be utilized to distribute content to any number of devices in the system 100, such as, but not limited to, first user device 102, second user device 106, third user device 111, the digital video recorder 170, or any combination thereof. The storage device 180 may be communicatively linked with any device, component, and/or network of the system 100. In certain embodiments, the storage device 180 may provide storage-based buffering, such as during a low-bandwidth delivery mode of the system 100, which may be utilized to enable content to be presented and/or downloaded at a selected time by users in the system 100.

The system 100 may further include a wireless network 185. The wireless network 185 may be a network that may be utilized to connect the first user device 102, the second user device 106, the third user device 111, the digital video recorder 170, the media device 175, the DSLAM 165, the VRAD 162, any of the devices in the system 100, any network in the system 100, or any combination thereof, with one another. In certain embodiments, the wireless network 185 may be a public network, a private network, a household network, a Wi-Fi network, an Ethernet network, any type of local network, any type of network, or any combination thereof. The wireless network 185 may also be configured to support infrared radiation technologies, Bluetooth connectivity technologies, ZigBee technologies, Z-Wave technologies, any type of wireless protocol, radio technologies, or any combination thereof. In certain embodiments, the first user device 102, the second user device 106, and/or the third user device 111 may only access the wireless network 185 after providing valid authentication credentials, such as into one or more applications executing on the first, second, and/or third user devices 102, 106, 111. In certain embodiments, the wireless network 185 may include any functionality an features of a traditional local area network. In certain embodiments, the first and second users 101, 111 may access the wireless network 175 even if the first and second users 101, 111 reside in different locations and/or are located in different locations. In certain embodiments, the wireless network 185 may be configured to communicate with any network in the system 100, any device in system 100, or any combination thereof.

Operatively, the system 100 may provide efficient delivery of media content to the masses as shown in the following exemplary scenario. In the example scenario, one or more user devices in the system 100 may request content. For example, the first user 101 and the second user 110 may request content, such as a movie, by using applications executing on the first user device 102 and third user device 111 respectively. In certain embodiments, the first and second users 101, 110 may be located in the same area, and, in other embodiments, the first and second users 101, 110 may be located in different areas. The requested content may include, but is not limited to, video content, visual content, audio content, text content, gaming content, virtual reality content, music content, software content, software updates, firmware updates, news content, any type of software, any type of content, any type of data files, any type of information, or any combination thereof. The requests may be received by the wireless network 185, the digital video recorder 170, the VRAD 162, the DSLAM 165, the cell site 137, the servers 140, 145, the server 160, or any combination thereof. In certain embodiments, the requests for content may indicate fulfillment timeframes that indicate time periods that the users would like to receive the content from the system 100. In certain embodiments, the users may set the fulfillment timeframes for each request, the service provider may set the fulfillment timeframes for each request, and/or the system 100 may set the fulfillment timeframes for each request.

Once the requests for the content are received, the system 100 may synchronize fulfillment timeframes for delivering the content to the plurality of user devices based on a preset time interval for delivering the content. The synchronization, for example, may be performed by utilizing any combination of the first user device 102, the second user device 106, the third user device 111, cell site 137, the server 140, the server 145, the server 160, the communications network 135, the wireless network 185, the VRAD 162, the DSLAM 165, and the digital video recorder 170. Based on each of the requests for content, the time for fulfilling the requests for may be synchronized so as to minimize the use of network resources of the system 100. For example, if the first request from the first user 101 indicates that the first request should be fulfilled sometime between 5:00 PM and 6:30 PM and the second request from the second user 110 indicates that the second request should be fulfilled between 6:00 PM and 11:30 PM, the system 100 may cause the content to be delivered between the time interval of 6:00 PM to 6:30 PM so that the timeframes for fulfilling both of the requests for the content may be synchronized.

In certain embodiments, the preset time interval for delivering the content may correspond with a portion of time during which fulfillment timeframes for different requests for content have some overlap. Using the above example, the preset time interval may be between 6:00 PM and 6:30 PM because the fulfillment timeframes for the first and second requests overlap during that time interval. In certain embodiments, the preset time interval may also indicate how often the content (e.g. number of times) is delivered to the plurality of user devices or to other devices in the system 100. In certain embodiments, the preset time interval for delivering the content and synchronizing the fulfillment timeframes may be determined based on network conditions, service provider preferences, or any combination thereof. For example, even though the time interval between 6:00 PM and 6:30 PM may be an optimal time to deliver content because of the overlap in fulfillment timeframes for the requests from the first and second users 101, 110, the system 100 may determine that the network resources may be overwhelmed during that time period and that the fulfillment timeframes should be synchronized for delivering the requested content at a later time in the day so as to conserve network resources.

Once the fulfillment timeframes for delivering the content to the plurality of user devices are synchronized, the system 100 may deliver, such as via satellite network 120 (or any other chosen network), the content to a storage device according to the preset time interval for delivering the content. For example, using the above example, the content may be delivered to the storage device sometime between 6:00 PM and 6:30 PM. The storage device, for example, may be the digital video recorder 170, the VRAD 162, the DSLAM 165, the storage device 180, any other storage device, or any combination thereof. In certain embodiments, the content may be delivered to the storage device only once a threshold number of requests for the same content have been received by the system 100. Once the content is delivered to the storage device or at any other selected time, the system 100 may determine if there are any wireless networks available to the user devices that requested the content. For example, the system 100 may determine that wireless network 185 is available to the first user device 102, the second user device 106, the third user device 111, the digital video recorder 170, the media device 175, and/or the storage device 180. If the wireless network 185 is determined to be available, the storage device may transmit the content via the wireless network 185 to each of the user devices that requested the content. Using the above example, the content may be transmitted from the storage device (e.g. digital video recorder 170 and/or storage device 180, etc.) to the first and third user devices 102, 111. If the wireless network 185 is not available, the system 100 may deliver the content to the first and third user devices 102, 111 via a cellular network, satellite network 120, fiber network 125, other network, using the transceiver 171 of the digital video recorder 170, the VRAD 162, the DSLAM 165, or any combination thereof. Once the content is delivered to the user devices, the user devices may display or otherwise output the content to the users that requested the content.

In certain embodiments, the system 100 may send the content directly from the satellite network 120, the fiber network 125, the servers 140, 145, the VRAD 162, the DSLAM 165 to the user devices that request the content. In certain embodiments, the content may be received by the storage device using a low-bandwidth delivery mode that employs storage-based buffering so that the content may be viewed and/or outputted at a later time. In certain embodiments, the content may be delivered via a cellular network (e.g. communications network 135) if delivering the content to the user devices during the fulfillment timeframes does not use up a threshold amount of bandwidth of the cellular network. In certain embodiments, if the content is delivered via the cellular network, the system 100 may provide a reduction in the fees per bit delivered and/or with an offset of the cost paid by the service provider for delivering the bits of the content using the cellular network.

In certain embodiments, any of the devices in the system 100 may serve as a media collection proxy for another device in the system 100. For example, if first user device 102 and second user device 106 are both owned and/or managed by the first user 101, and the first user device 102 has already received the content (e.g. from digital video recorder 170, VRAD 162, etc.), the first user device 102 may transmit the content to the second user device 106. In certain embodiments, the first user device 102 may transmit the content to the second user device 106 by using a cellular network, the wireless network 185, a public network, any other network, or any combination thereof. In certain embodiments, the first user device 102 serving as the media collection proxy may transmit the content to the second user device 106 when the first and second user devices 102, 106 converge together in a common location and/or when the first and second user devices 102, 106 come within communication range of each other. Notably, any of the devices in the system 100 may be utilized to transmit the content to any of the other devices in the system 100 depending on network conditions, service provider preferences, user preferences, network availability, or any combination thereof.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving requests for content from one or more user devices; determining if a threshold number of requests for the content have been received; synchronizing fulfillment timeframes for delivering the content to the user devices based on preset time intervals for delivering the content; delivering, via a satellite network 120, the content to a storage device; determining if there is a wireless network 185 available for communicatively linking the devices requesting the content; delivering, via the wireless network 185, the request content from the storage device to user devices requesting the content if the wireless network 185 is available; delivering, via another network, the content to the devices if the wireless network 185 is not available; determining if there are other devices requesting the content; delivering the content to the other devices when the other devices are in communication range of one of the original user devices that requested the content; presenting the content; and performing any other suitable operations conducted in the system 100 or otherwise. In one embodiment, multiple servers 160 may be utilized to process the functions of the system 100. The server 160 and other devices in the system 100 may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100 the system 100 may include any configuration of the components, which may include using a greater or lesser number of the components. For example, the system 100 is illustratively shown as including a first user device 102, a second user device 106, a third user device 111, a satellite network 120, a fiber network 125, a communications network 135, a cell site 137, a server 140, a server 145, a server 160, a database 155, a VRAD 162, a DSLAM 165, a digital video recorder 170, a media device 175, a storage device 180, and a wireless network 185. However, the system 100 may include multiple first user devices 102, multiple second user devices 106, multiple third user devices 111, multiple satellite networks 120, multiple fiber networks 125, multiple communications networks 135, multiple cell sites 137, multiple servers 140, multiple servers 145, multiple servers 160, multiple databases 155, multiple VRADs 162, multiple DSLAMs 165, multiple digital video recorders 170, multiple media devices 175, multiple storage devices 180, multiple wireless networks 185, or any number of any of the other components in the system 100. Furthermore, in certain embodiments, substantial portions of the functionality and operations of the system 100 may be performed by other networks and systems that may be connected to system 100.

Figure 2:
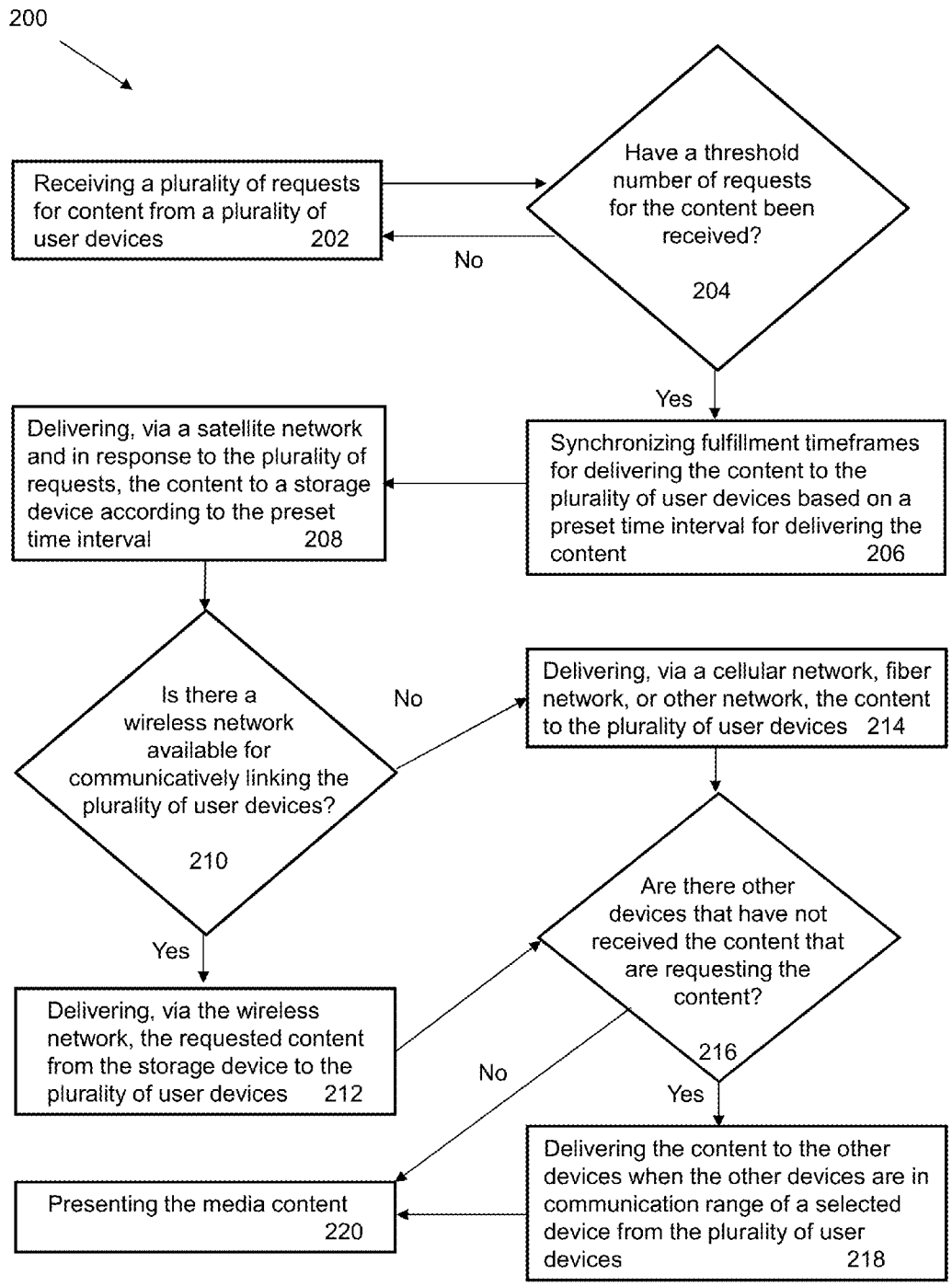
FIG. 2 is a flow diagram illustrating a sample method for providing efficient delivery of media content to the masses according to an embodiment of the present disclosure.

As shown in FIG. 2, an exemplary method 200 for providing efficient delivery of media content to the masses is schematically illustrated, and may include, at step 202, receiving a plurality of requests for content from a plurality of user devices. In certain embodiments, the receiving of the requests from the plurality of user devices may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, any combination thereof, or by utilizing any other appropriate program, network, system, or device. At step 204, the method 200 may include determining if a threshold number of requests for the content have been received. For example, if the threshold number of requests according to the method 200 is 10 requests and the number of requests received is only 5 requests, then the required threshold number of requests would not have been received. In certain embodiments, the determining may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, any combination thereof, or by utilizing any other appropriate program, network, system, or device.

If, at step 204, it is determined that the threshold number of requests for the content have not been received, the method 200 may include reverting back to step 202 until the threshold number of requests for the content have been received. If, however, at step 204, it is determined that the threshold number of requests for the content have been received, the method 200 may include proceeding to step 206, which includes synchronizing fulfillment timeframes for delivering the content to the plurality of user devices based on a preset time interval for delivering the content. In certain embodiments, the synchronization may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, any combination thereof, or by utilizing any other appropriate program, network, system, or device.

In certain embodiments, based on each of the requests for content, the time for fulfilling the requests for may be synchronized so as to minimize the use of network resources of the system 100. For example, if half of the requests for the content are to be fulfilled sometime between 10:00 PM and 11:00 PM and the other half of the requests for the content are to be fulfilled between 10:30 PM and 11:30 PM, the method 200 may cause the content to be delivered between the time interval 10:30 PM and 11:00 PM so that the timeframes for fulfilling the requests for the content may be synchronized. In certain embodiments, the preset time interval for delivering the content may correspond with a portion of time during which fulfillment timeframes for different requests for content have some overlap. Using the above example, the preset time interval may be between 10:30 PM and 11:00 PM because the fulfillment timeframes for the first and second halves of requests overlap during that time interval. In certain embodiments, the preset time interval may also indicate how often the content is delivered to the plurality of user devices or to other devices in the system 100. In certain embodiments, the preset time interval for delivering the content and synchronizing the fulfillment timeframes may be determined based on network conditions, service provider preferences, or any combination thereof.

Once the fulfillment timeframes for delivering the content to the plurality of user devices are synchronized, the method 200 may include, at step 208, delivering, such as via a satellite network and in response to the requests for the content, the content to a storage device according to the preset time interval for delivering the content. The storage device, for example, may be the digital video recorder 170, the VRAD 162, the DSLAM 165, the storage device 180, any other storage device, or any combination thereof. Using the above example, the content may be delivered to the storage device at a time such that the content may be delivered to the plurality of user devices requesting the content between 10:30 PM and 11:00 PM. In certain embodiments, the delivering of the content to the storage device may be performed by utilizing the satellite network 120, the fiber network 125, the first user device 102, the second user device 106, the third user device 111, cell site 137, the server 140, the server 145, the server 160, the communications network 135, the wireless network 185, the VRAD 162, the DSLAM 165, the digital video recorder 170, the storage device 180, any combination thereof, or by utilizing any other appropriate program, network, system, or device.

Once the content is delivered to the storage device, the method 200 may include, at step 210, determining if there is a wireless network available for communicatively linking the plurality of user devices that requested and/or are requesting the content and/or is accessible by the plurality of user devices. In certain embodiments, prior knowledge of the physical availability of the wireless network may be utilized to enable the scheduling of the delivery of the content to the plurality of user devices requesting the content. In certain embodiments, the determining may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, the storage device 180, any combination thereof, or by utilizing any other appropriate program, network, system, or device. If, at step 210, there is a wireless network, such as wireless network 185, determined to be available for communicatively linking the plurality of user devices, the method 200 may include proceeding to step 212, which may include delivering the content from the storage device to the plurality of users via the wireless network. In certain embodiments, the delivering of the content from the storage device to the plurality of users may be performed by utilizing the first user device 102, the second user device 106, the third user device 111, the server 140, the server 145, the server 160, the communications network 135, the wireless network 185, the VRAD 162, the DSLAM 165, the digital video recorder 170, the storage device 180, any combination thereof, or by utilizing any other appropriate program, network, system, or device.

If, however, at step 210, there is determined to be no wireless network available for communicatively linking the plurality of user devices requesting the content and/or accessible by the plurality of user devices, the method may include, proceeding to step 214, delivering the content from the storage device to the plurality of user devices via a cellular network, a fiber network, another network, or any combination thereof. In certain embodiments, the delivering of the content to the plurality of user devices may be performed by utilizing the satellite network 120, the fiber network 125, the first user device 102, the second user device 106, the third user device 111, cell site 137, the server 140, the server 145, the server 160, the communications network 135, the VRAD 162, the DSLAM 165, the digital video recorder 170, the storage device 180, any combination thereof, or by utilizing any other appropriate program, network, system, or device. At step 216, the method 200 may include determining if there are other devices that have not already received the content, but have requested the content. For example, this may occur if other devices have requested the content after the content has been delivered to the other user devices that have already requested the content, after the fulfillment timeframes have been synchronized at step 206, at other designated times, or any combination thereof.

In certain embodiments, the determining may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, any combination thereof, or by utilizing any other appropriate program, network, system, or device.

If, at step 216, there are other devices that have requested the content, but have not yet received the content, the method 200 may include, at step 218, delivering the content to the other devices requesting the content. For example, the content may be delivered to the other devices when the other devices are within a communication range of at least one of the user devices of the plurality of user devices that already received the content. In certain embodiments, the delivering of the content to the other devices may be performed by utilizing the first user device 102, the second user device 106, the third user device 111, cell site 137, the server 140, the server 145, the server 160, the communications network 135, the wireless network 185, the VRAD 162, the DSLAM 165, the digital video recorder 170, any combination thereof, or by utilizing any other appropriate program, network, system, or device. The method 200 may then proceed to step 220, which may include presenting the media content. For example, the media content may be a movie that may be displayed on an interface of the first user device 102 or any other appropriate device. In certain embodiments, the presenting of the media content may be performed by utilizing the first user device 102, the second user device 106, the third user device 111, the communications network 135, the wireless network 185, the VRAD 162, the DSLAM 165, the digital video recorder 170, the media device 175, any combination thereof, or by utilizing any other appropriate program, network, system, or device. Notably, the method 200 may further incorporate any of the functionality and features as described for system 100 or as otherwise described herein.

Notably, the system 100 and methods disclosed herein may include additional functionality and features. For example, in certain embodiments, the content may be delivered from the VRAD 162 equipped with satellite receiver 163 and antenna 164, and/or DSLAM 165 equipped with the satellite receiver 166 and antenna 167 via Wi-Max, Wi-Fi or other wireless technology to supplant or supplement a wired backhaul of cell site 137 when delivering the content to the user devices requesting the content. In certain embodiments, the users may be provided with a menu of content delivery options, such as via a user interface of the first, second, and third user devices 102, 106, 111, which may allow the users to select which networks and/or devices are utilized to deliver the content to the first, second, and third user devices 102, 106, 111. In certain embodiments, the system 100 may pre-load content onto a storage device (e.g. digital video recorder 170, storage device 180, etc.) at an off-peak time so that the content may be viewed at a selected time chosen by the user.

In certain embodiments, the system 100 and methods may include providing restrictions on viewing or outputting content until a time authorized by a service provider, content provider, or artist. In certain embodiments, the first and second users 101, 110 may be provided the option, such as via an application executing on the first, second, and third user devices 102, 106, 111, to agree to fulfillment timeframes for delivering the content to their respective user devices. For example, the first user 101 may input information indicating that the first user 101 agrees to have the media content delivered at the same time that the media content is to be delivered to the second user 110. In certain embodiments, the options of agreeing to fulfillment timeframes may be provided on social media applications and/or profiles so that many users in a community may view and agree on fulfillment timeframes for delivering the content. In further embodiments, the system 100 may generate a demand curve based on the requests received for content and set the times for delivering the content during times in the demand curve when demand for content is lower than a certain threshold. In certain embodiments, the first user 101 may transmit a confirmation (e.g. via first user device 102) for approving and/or agreeing with a fulfillment timeframe proposed in response to a text message received from the third user device 111 of the second user 110.

Figure 3:
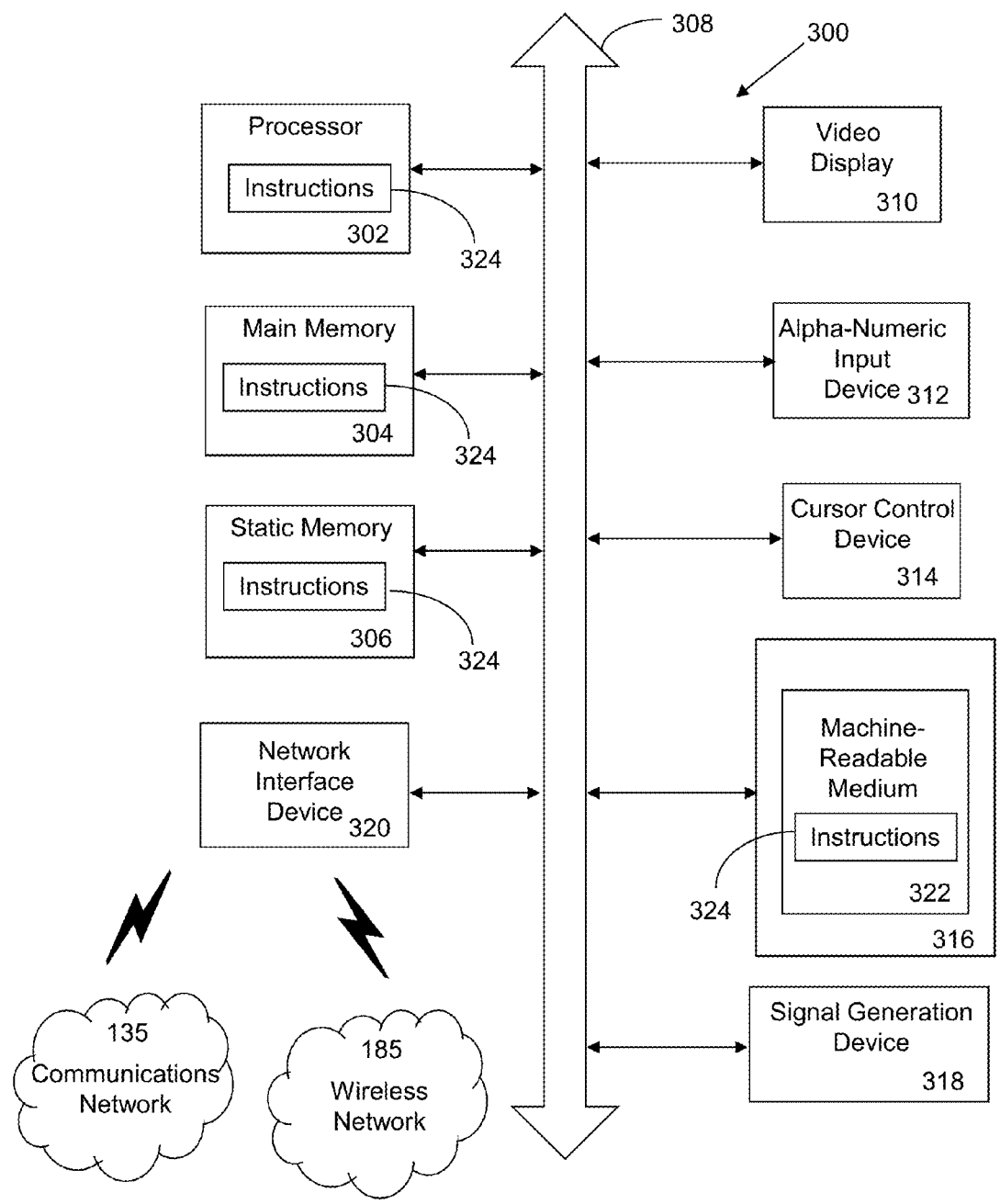
FIG. 3 is a schematic diagram of a machine in the form of a computer system within which a set of instructions, when executed, may cause the machine to perform any one or more of the methodologies or operations of the systems and methods for providing efficient delivery of media content to the masses.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, wireless network 185, another network, or a combination thereof) to and assist with operations performed by other machines and systems, such as, but not limited to, the first user device 102, the second user device 106, the third user device 111, the cell site 137, the server 140, the server 145, the database 155, the server 160, the VRAD 162, the DSLAM 165, the digital video recorder 170, the media device 175, the storage device 180, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the communications network 135, the wireless network 185, another network, or a combination thereof, can send or receive voice, video or data, and to communicate over the communications network 135, the wireless network 185, another network, or a combination thereof, using the instructions. The instructions 324 may further be transmitted or received over the communications network 135, the wireless network 185, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
   receiving a plurality of requests for content from a plurality of user devices;
   generating a menu of content delivery options for delivering the content;
   providing, via applications executing on the plurality of user devices, the menu of content delivery options for delivering the content requested by the plurality of user devices, wherein the menu allows the plurality of user devices to select which networks and devices are to be utilized to deliver the content;
   receiving, from the plurality of user devices and via the menu, selections indicating the networks and the devices for delivering the content to the plurality of user devices;
   synchronizing, in response to the plurality of requests and when a threshold number of requests of the plurality of requests for the content are received, fulfillment timeframes for delivering the content to the plurality of user devices so as to minimize use of network resources of the system, wherein the fulfillment timeframes are synchronized based on a preset time interval for delivering the content;
   confirming the fulfillment timeframes based on a proposal for agreeing to the fulfillment timeframes provided in a text message received from a first user device of the plurality of user devices, wherein an option for making the proposal for agreeing to the fulfillment timeframes is provided on a profile of a user using the first user device;
   determining an availability of the wireless network to the plurality of user devices prior to delivering the content from the storage device to the first user device;
   delivering, via a satellite network included in the selections and in response to the plurality of requests, the content to a storage device according to the preset time interval when the threshold number of requests for the content are received; and
   delivering, via a wireless network included in the selections and communicatively linked to the plurality of user devices, the content from the storage device to the plurality of user devices.

2. The system of claim 1, wherein the operations further comprise enabling the first user device of the plurality of user devices to serve as a media collection proxy for a second user device under control of an entity that controls the first device.

3. The system of claim 2, wherein the operations further comprise transmitting, via the wireless network and by using the first user device, the content from the first user device to the second user device.

4. The system of claim 3, wherein the operations further comprise transmitting the content from the first user device to the second user device when the first user device and second user device converge to a common location.

5. The system of claim 1, wherein the operations further comprise determining the preset time interval for delivering the content based on a network condition.

6. The system of claim 1, wherein the operations further comprise delivering the content to the storage device in non-real-time using a low-bandwidth delivery mode.

7. The system of claim 1, wherein the operations further comprise delivering, via the satellite network, the content to a video-ready-access device equipped with a satellite receiver and antenna.

8. The system of claim 1, wherein the operations further comprise delivering, via the satellite network, the content to a digital subscriber line access multiplexer equipped with a satellite receiver and antenna.

9. The system of claim 1, wherein the operations further comprise preventing presentation of the content delivered to the plurality of user devices after a time period expires.

10. The system of claim 1, wherein the operations further comprise enabling selection of the wireless network via the menu.

11. The system of claim 1, wherein the operations further comprise synchronizing the fulfillment timeframes for delivering the content based on receiving an input from a user associated with the plurality of user devices indicating the preset time interval for delivering the content.

12. The system of claim 1, wherein the storage device comprises a digital video recorder, and wherein the operations further comprise displaying the content on the digital video recorder on a media device communicatively linked to the digital video recorder.

13. A method, comprising:
   receiving a plurality of requests for content from a plurality of user devices;
   generating a menu of content delivery options for delivering the content;
   providing, via applications executing on the plurality of user devices, the menu of content delivery options for delivering the content requested by the plurality of user devices, wherein the menu allows the plurality of user devices to select which networks and devices are to be utilized to deliver the content;
   receiving, from the plurality of user devices and via the menu, selections indicating the networks and the devices for delivering the content to the plurality of user devices;
   synchronizing, in response to the plurality of requests and when a threshold number of requests of the plurality of requests for the content are received, fulfillment timeframes for delivering the content to the plurality of user devices so as to minimize use of network resources, wherein the fulfillment timeframes are synchronized based on a preset time interval for delivering the content, wherein the synchronizing is performed by utilizing instructions from a memory that are executed by a processor;
   confirming the fulfillment timeframes based on a proposal for agreeing to the fulfillment timeframes provided in a text message received from a first user device of the plurality of user devices, wherein an option for making the proposal for agreeing to the fulfillment timeframes is provided on a profile of a user using the first user device;
   determining an availability of the wireless network to the plurality of user devices prior to delivering the content from the storage device to the plurality of user devices;
   delivering, via a satellite network included in the selections and in response to the plurality of requests, the content to a storage device according to the preset time interval when the threshold number of requests for the content are received; and
   transmitting, via a wireless network included in the selections and communicatively linked to the plurality of user devices, the content from the storage device to the plurality of user devices.

14. The method of claim 13, further comprising enabling display of the content delivered to the plurality of user devices only after a time period expires.

15. The method of claim 13, further comprising synchronizing the fulfillment timeframes for delivering the content based on receiving inputs from users associated with the plurality of user devices indicating the preset time interval.

16. The method of claim 13, further comprising enabling the first user device of the plurality of user devices to serve as a media collection proxy for a second user device under control of an entity that controls the first device.

17. The method of claim 16, further comprising transmitting, via the wireless network and by using the first user device, the content from the first user device to the second user device.

18. A computer-readable device comprising instructions, which when executed by a processor, cause the processor to perform operations comprising:
   receiving a plurality of requests for content from a plurality of user devices;
   generating a menu of content delivery options for delivering the content;
   providing, via applications executing on the plurality of user devices, the menu of content delivery options for delivering the content requested by the plurality of user devices, wherein the menu allows the plurality of user devices to select which networks and devices are to be utilized to deliver the content;
   receiving, from the plurality of user devices and via the menu, selections indicating networks and devices for delivering the content to the plurality of user devices;
   synchronizing, in response to the plurality of requests and when a threshold number of requests of the plurality of requests for the content are received, fulfillment timeframes for delivering the content to the plurality of user devices so as to minimize use of network resources, wherein the fulfillment timeframes are synchronized based on a preset time interval for delivering the content;
   confirming the fulfillment timeframes based on a proposal for agreeing to the fulfillment timeframes provided in a text message received from a first user device of the plurality of user devices, wherein an option for making the proposal for agreeing to the fulfillment timeframes is provided on a profile of a user using the first user device;
   determining an availability of the wireless network to the plurality of user devices prior to delivering the content from the storage device to the plurality of user devices;
   delivering, via a satellite network included in the selections and in response to the plurality of requests, the content to a storage device according to the preset time interval when the threshold number of requests for the content are received; and
   delivering, via a wireless network included in the selections and communicatively linked to the plurality of user devices, the content from the storage device to the plurality of user devices.

* * * * *